United States Patent [19]

Roberts et al.

[11] Patent Number: 4,604,427
[45] Date of Patent: Aug. 5, 1986

[54] METHOD OF FORMING ELECTRICALLY CONDUCTIVE POLYMER BLENDS

[75] Inventors: William P. Roberts, Columbia; Leslie A. Schulz, Olney, both of Md.

[73] Assignee: W. R. Grace & Co., New York, N.Y.

[21] Appl. No.: 756,534

[22] Filed: Jul. 19, 1985

Related U.S. Application Data

[63] Continuation-in-part of Ser. No. 685,887, Dec. 24, 1984, abandoned.

[51] Int. Cl.[4] ............................................. C08L 79/04
[52] U.S. Cl. .................................... 525/185; 252/500; 252/518; 252/519; 523/137; 525/58; 525/186; 525/417; 428/365; 428/394; 428/395; 428/396
[58] Field of Search ............... 525/186, 185, 417, 453, 525/420, 467, 58; 252/518, 500, 519; 523/137; 428/365, 394, 395, 396

[56] References Cited

PUBLICATIONS

Mol. Cryst. Liq. Cryst., 1982, vol. 83, pp. 253-263, "Preparation and Characterization of Neutral and Oxidized Polypyrrole Films"—G. B. Street, T. C. Clarke, M. Krounbi, K. Kanazawa, V. Lee, P. Pfluger, J. S. Scott and G. Weiser.

"Aqueous Chemistry and Electrochemistry of Polyacetylene and Polyaniline: Application to Rechargeable Batteries"—A. G. MacDiarmid, J. C. Chiang, M. Halpern, W. S. Huang, J. R. Krawczyk, R. J. Mammone, S. L. Mu, N. L. D. Somasiri and W. Wu.

J. Chem. Soc., Chem. Commun., 1984, "Conductive Composites from Poly(Vinyl Chloride) and Polypyrrole"—M. A. DePaoli, R. J. Waltman, A. F. Diaz and J. Bargon (pp. 1015 and 1016).

J. Chem. Soc., Chem. Commun., 1984, "Electrochemical Polymerization of Pyrrole on Polymer-Coated Electrodes"—O. Niwa and T. Tamamura (pp. 817 and 818).

"The Oxidation of Monocyclic Pyrroles"—G. P. Gardini (pp. 67-98).

Journal of Electronic Materials, vol. 13, No. 1, 1984-"-Some Properties of Polypyrrole-Paper Composites—R. B. Bjorkjund and I. Lundström (pp. 211-230).

Primary Examiner—Theodore E. Pertilla
Attorney, Agent, or Firm—Richard P. Plunkett; William W. McDowell, Jr.

[57] ABSTRACT

This invention relates to a chemical method of forming an electrically conductive polymer blend which comprises impregnating a non-porous, swellable or soluble host polymer with:

(a) one or more cyclic compounds selected from the group consisting of pyrrole, aniline and substituted analogues of said group members, and (b) at least one chemical oxidant selected from the group consisting of trivalent compounds, tetravalent cerium compounds, hexavalent molybdenum, tungsten or chromium compounds, divalent copper compounds, monovalent silver compounds, nitrites, quinones, peroxides and peracids, said oxidant being dissolved in a solvent capable of swelling or solubilizing said host polymer.

7 Claims, No Drawings

METHOD OF FORMING ELECTRICALLY CONDUCTIVE POLYMER BLENDS

This application is a continuation-in-part of our co-pending application having Ser. No. 685,887, filed Dec. 24, 1984, now abandoned.

BACKGROUND OF THE INVENTION

1. Field of the Invention

This invention relates to a method for rendering insulating polymeric materials electrically conductive by impregnation of their surface with a conductive polymer. More particularly, this invention relates to a method of forming electrically conductive polymer blends within the surface layer of a non-porous host polymer.

2. Description of the Prior Art

Electrically conductive polymers are the focus of considerable interest as they are possible replacements for metallic conductors or semi-conductors in a wide variety of applications such as batteries, photovoltaics, electrostatic dissipation and electromagnetic shielding. Potential advantages of conductive polymers over conventional metallic conductors lie in their potential for light weight, lower cost and greater versatility in terms of synthesis and fabrication. However, most electrically conductive polymer systems produced to date are not sufficiently stable or processable for use in such application areas.

Conductive polymer blends (i.e., conductive polymers which are intimately mixed with one or more conventional polymers) have been prepared by several workers as a possible means of achieving improved environmental stability and/or mechanical properties for a given conductive polymer. Another potentially advantageous aspect of such polymer blends is that processing of the conductive polymer component becomes unnecessary if it can be synthesized within a suitably fabricated host polymer matrix, e.g., a thin film or fiber.

Particularly attractive for incorporation into conductive polymer blends would be the conductive polymers polypyrrole, polyaniline and their analogs. See Mol. Cryst. Liq. Cryst., 1982, Vol. 83, pp. 253-264, "Preparation and Characterization of Neutral and Oxidized Polypyrrole Films", G. B. Street, T. C. Clarke, M. Krounbi, K. Kanazawa, V. Lee, P. Pfluger, J. C. Scott and G. Weiser, and references therein (polypyrrole); see "Aqueous Chemistry and Electrochemistry of Polyacetylene and 'Polyaniline': Application to Rechargeable Batteries", pp. 248 and 249," A. J. Macdiarmid, J. C. Chiang, M. Halpern, W. S. Huang, J. R. Karwczyk, R. J. Mammone, S. L. Mu, N. L. D. Somasiri and W. Wu (polyaniline). These polymers exhibit good environmental stability and are potentially inexpensive to produce but suffer from a need for improved mechanical properties and processibility.

Incorporation of polypyrrole into polymer blends has been achieved by an electrochemical process wherein the pyrrole monomer is oxidatively polymerized to polypyrrole at a polymer-coated electrode. By this process, polypyrrole can be impregnated into the polymer which coats the electrode. See J. Chem. Soc., Chem. Commun., 1984, pp. 1015 and 1016, "Conductive Composites from Poly9vinylchloride) and Polypyrrole", M. A. DePaoli, R. J. Waltman, A. F. Diaz and J. Bargon and J. Chem. Soc., Chem. Commun., 1984, pp. 817 and 818, "Electrochemical Polymerization of Pyrrole and Polymer-coated Electrodes", O. Niwa and T. Tamamura. Two limitations of this process are that it is only applicable to uniform thin films of polymers and that it would be difficult to perform on a large scale due to electrode surface area limitations coupled with the apparent requirement of using a batch-type process.

In this respect, a general chemical process, rather than an electrochemical process, for the formation of polypyrrole blends could be operable on a much wider variety of materials, particularly thick films, fibers and molded polymeric articles. It is well known that pyrrole reacts with a number of chemical oxidizing agents, most notably trivalent iron compounds, to produce the so-called "pyrrole blacks", which are qualitatively identical in appearance, electrical properties and basic chemical composition, to the aforementioned polypyrrole. (4) See G. P. Gardini, "The Oxidation of Monocyclic Pyrroles", Adv. Heterocycl. Chem. 15, 67-98 (1973), and references therein, and Polymer Preprints, Japan, Vol. 33, p. 495 (1984) (reference attached).

Based on this chemical polypyrrole formation, absorption of oxidizing agents, particularly iron trichloride, into paper and other porous materials has been used as a method of activating such substances towards polypyrrole formation within the interstitial spaces when subsequently treated with pyrrole. See Journal of Electronic Materials, Vol. 13, No. 1, 1984, pp. 211-230, "Some Properties of Polypyrrole-Paper Composites", R. B. Bjorklund and I. Lundstroem, and German Application No. P 33 21 281.3, published Dec. 22, 1983. This process affords conductive composite materials. However, this process does not afford a general method of impregnating polypyrrole into non-porous polymeric materials to produce conductive polymer blends, nor is it likely such a process was contemplated, because the oxidant cannot be effectively absorbed into such non-porous polymeric materials unless it is soluble in the polymer itself.

With respect to the conductive polymer polyaniline, no prior art relating to the incorporation of polyaniline into polymer blends is known to Applicants at this time.

OBJECT OF THE INVENTION

One object of the instant invention is to produce electrically conductive polymeric materials which combine low cost, high electrical conductivity, good environmental stability, versatility in fabrication and good mechanical properties. Another object of this invention is to produce electrically conductive polymer blends. A further object of this invention is to afford a means of increasing the electrical conductivity of normally insulating polymeric materials by a simple chemical means which can be performed as a post-processing modification. A still further object of this invention is to afford a means of increasing the electrical conductivity of polymeric materials without relying on a conductive metallic surface coating or conductive filler particles, and without appreciably changing the mechanical properties of the host polymer. Other objects will become apparent from a reading hereinafter.

DESCRIPTION OF THE INVENTION

The present invention relates to a specific chemical procedure for the formation of conducting polymers within the surface layer of non-porous polymers (herein referred to as "the host polymer(s)") to give an electrically conductive polymer blend. This procedure relies on the incorporation of pyrrole, aniline or analogue thereof (herein referred to as "the cyclic monomer(s)") into the host polymer matrix, followed by exposure of the impregnated host polymer to oxidants that can cause the formation of the conductive polymers derived from the cyclic monomers, according to known chemical processes, within the surface layer of the host polymer. The reaction between the cyclic monomer and the oxidant occurs rapidly with respect to the diffusion of the cyclic monomer out of the host polymer, thereby permitting the conductive polymer reaction product to be formed within the surface layer of the host polymer.

The host polymer, i.e., the polymer which is to be rendered conductive by impregnation with a conductive polymer, is typically a thermoplastic or elastomeric polymer. Elastomers which are operable as the host polymer include, but are not limited to, acrylonitrilebutadiene-styrene copolymers, butadiene-styrene copolymers, chloroprene-acrylonitrile copolymers, ethylacrylate-chloroethylvinyl ether copolymers, isobutylene-isoprene copolymers, isobutylene-styrene copolymers, polychloroprene copolymers, polyisobutylenes, polyurethanes, polysulfides, silicones and the like. Thermoplastic polymers operable herein as host polymer include, but are not limited to, polyvinyl chloride and high vinyl chloride copolymers, polyvinyl acetate, vinylidine chloride copolymers, polyvinyl butyral, polyvinyl alcohol, polyvinyl acetaldehyde acetal, polyvinyl formal, polycarbonate, polypropylene, polyurethane, polystyrene, styrene copolymers, such as styrene-acrylonitrile, and polyacrylonitrile, polyamides, polymethacrylates, polyacrylates, polyethylene terephthalate polymers and the like. The aforesaid elastomers and thermoplastic polymers should be inert to the cyclic compounds and the chemical oxidants used in conjunction with the host polymer to form the electrically conductive polymer blend.

The host polymer can be present in various forms such as film, sheeting, powder, fiber or a preformed structure. In the case of fibers and thin (i.e., less than 1 mm thick) films, the entire polymer may be impregnated, whereas in the case of thicker materials a surface layer of the host polymer up to 1 mm deep may be impregnated.

Particularly, preferable in this regard are polymers which exhibit a substantial (i.e., 1–50%) weight gain on exposure to pyrrole, aniline or analogues thereof in the solution or vapor phase, at room temperature or elevated temperatures. Also, particularly preferable are those polymers which can be codissolved with the cyclic monomers in an organic solvent which is more volatile than the cyclic monomer component, and can therefore be removed by evaporation to leave behind the host polymer impregnated with the cyclic monomer. Operable solvents may include, but are not limited to, chlorocarbons, alcohols, acetonitrile, aromatic hydrocarbons, ethers and the like.

The cyclic monomers operable herein to afford electrical conductivity to the host polymer are selected from the group consisting of pyrrole, aniline and substituted analogues of said monomers. Such analogues include, but are not limited to, N-methylpyrrole, 3-methylpyrrole, 3,5-dimethylpyrrole, 2,2'-bipyrrole, N-methylaniline, 2-methylaniline, 3-methylaniline and N-phenyl-1,4-diaminobenzene.

The chemical oxidants operable herein include chemical compounds which contain a metal ion which can change its valence. Such materials are exemplified by $FeCl_3$, $Fe_2(SO_4)_3$, $K_3(Fe(CN)_6)$, $H_3PO_4 \cdot 12MoO_3$, $H_3PO_4 \cdot 12WO_3$, $CrO_3$, $(NH_4)_2Ce(NO_3)_6$, $Ce(SO_4)_2$, $CuCl_2$, $AgNO_3$. A particularly preferred chemical oxidant from the above grouping is iron trichloride.

Non-metallic containing compounds such as nitrites, quinones, peroxides and peracids are also operable as a chemical oxidant in the present invention. Such non-metallic materials include, but are not limited to, $HNO_2$, 1,4-benzoquinone, 2,3,5,6-tetrachloro-1,4-benzoquinone, hydrogen peroxide, peroxyacetic acid, peroxybenzoic acid, 3-chloro-peroxybenzoic acid and ammonium persulfate. A particularly preferred chemical oxidant from the above grouping is ammonium persulfate.

Oxidants are generally dissolved in polar organic or inorganic solvents which are inert towards the particular oxidants used. Typical solvents are water, alcohols, acetonitrile, acetic acid, acetone, amides, ethers and the like. Typical concentrations for the oxidant are within the range 0.1–1.0 molar.

In practicing the instant invention, auxiliary acids including, but not limited to, mineral, carboxylic and sulfonic may be used in conjunction with the aforementioned inorganic or organic oxidants. Thus, acids such as sulfuric, hydrochloric, acetic, trifluoroacetic, methanesulfonic or trifluoromethanesulfonic can be employed. Such acid may be co-dissolved with the oxidant in a suitable solvent or itself used as a solvent for the oxidant. The primary role of the auxiliary acid is that of catalyst for the oxidative polymerization process. Such added acids may be preferred but are not necessary in conjunction with the preferred oxidants. When auxiliary acids are added to the system, they are added in amounts in the range 0.01 to 100 moles acid/mole oxidant.

The polymerization of the cyclic monomer in the host polymer is usually carried out under ambient conditions at room temperature but may be carried out at any temperature which is within the liquid range of the oxidant solution and the solid range of the impregnated host polymer.

It is possible to control the final properties of the polymer blend, such as conductivity, physical appearance, depth of penetration of the conductive polymer into the host polymer surface and weight gain in the host polymer due to the conductive polymer component, by appropriate choice of oxidant, monomer, solvent and treatment conditions such as exposure time and temperature. Typically accessible ranges of properties are as follows:

Conductivity (S/cm): $10^{-10}$ to 1
Appearance: black, grey, green; translucent or opaque
Penetration depth of conductive polymer (microns): 1 to 1,000
Weight gain due to conductive polymer: 0.1% to 20%

The molar ratio of cyclic monomer to oxidant in the host polymer can be in the range 0.01 to 100. The theoretical stoichiometry for the reaction between a one-electron oxidant and pyrrole to give an oxidized polypyrrole requires a molar ratio of oxidant to pyrrole between 2:1 and 3:1.

The conductive polymeric materials formed by the process of the instant invention can be used as conductors or semi-conductors in such applications as electrostatic dissipation and electromagnetic shielding.

The following examples will aid in explaining, but expressly not limit, the instant invention. Unless otherwise noted, all parts and percentages are by weight.

EXAMPLE 1

Polyvinyl acetate (0.3 g) is dissolved in ethyl acetate (2 ml) containing 5% by volume of pyrrole. The resulting solution is spread out in a thin film (20 microns thick) on a glass slide and the solvent allowed to evaporate off. The coated glass slide is then dipped into a solution of iron trichloride (0.1 M) in aqueous hydrochloric acid (0.01 M). Within 1 hour, the film becomes gray and translucent in the region exposed to oxidant while the unexposed region remains clear. The glass slide is rinsed with water and allowed to dry at room temperature for ½ hour. The gray region of the film has a surface resistance of about $10^4$ ohms between two contacts, 0.5 cm apart, while the unexposed region has a surface resistance in excess of $10^{10}$ ohms.

EXAMPLE 2

Polyvinyl chloride (0.25 g) coarse powder is suspended in acetonitrile (2 ml) containing 5% by volume of pyrrole and stirred at room temperature for 1 hour. The resulting powder is then collected by filtration and suspended in the iron trichloride solution of Example 1, then stirred for ½ hour at room temperature. The resulting black powder is collected by filtration, washed with water and dried under a vacuum. The powder exhibits a bulk specific conductivity on compression (4,000 psi) of $4 \times 10^{-3}$ S/cm.

EXAMPLE 3

A solution of polyvinyl chloride (0.25 g) in tetrahydrofuran (2 ml) containing 10% by volume of pyrrole is spread onto a glass slide as in Example 1. The resulting thin film is peeled off of the glass backing and dipped into the iron trichloride solution of Example 1 for 1 hour. The resulting gray translucent film is rinsed with water and dried under vacuum. The specific conductivity of this film is determined to be $10^{-4}$ S/cm.

EXAMPLE 4

A sample of nylon staple fiber (30 micron dia., 0.46 g) is immersed in a solution consisting of 10% pyrrole by volume in acetonitrile. After 1 hour at room temperature, the fiber sample is removed, rinsed with distilled water and immersed in the iron trichloride solution of Example 1 for 1 hour at room temperature. The resulting gray fibers are removed, rinsed with distilled water and dried under a vacuum overnight. The treated fibers exhibit the following properties (initial properties given for comparison):

|  | Treated Fibers | Untreated Fibers |
| --- | --- | --- |
| Weight (grams): | 0.46 | 0.48 |
| Conductivity (S/cm): | $1.3 \times 10^{-3}$ | $<10^{-10}$ |
| Stress at failure (psi): | $2.5 \times 10^5$ | $1.1 \times 10^5$ |
| Strain at failure (%): | 54.1 | 75.8 |
| Modulus (psi, over 1% elongation): | $8.0 \times 10^5$ | $4.0 \times 10^5$ |

These results demonstrate that the conductivity of the fibers is dramatically increased by impregnation with polypyrrole, while their mechanical properties are not appreciably changed.

EXAMPLE 5

Polyvinyl chloride (0.2 g) is dissolved in tetrahydrofuran (2 ml) containing 10% by volume of aniline. The resulting solution is spread out into a thin layer as in Example 1 and allowed to dry at room temperature for 1 hour. The glass-backed polymer film is then dipped into a 10% solution of ammonium persulfate in aqueous hydrochloric acid (0.1 M)., After 1 hour at room temperature, the film is removed, rinsed with distilled water and allowed to dry at room temperature for 1 hour. The surface resistance of the resulting dark green translucent film is determined to be $5 \times 10^5$ ohms (2 probes, 0.5 cm apart).

EXAMPLE 6

The polypyrrole/nylon fibers of Example 4 are tested for stability by monitoring the resistance along a fixed length (about 0.5 cm) of a single fiber under various conditions. The results are given in TABLE I:

TABLE I

Resistance v, Time for single Fiber of Polypyrrole/Nylon under various Conditions

| | Resistance ($10^3$ ohms) | | | |
| --- | --- | --- | --- | --- |
| Time | 25° C. | Immersed Distilled Water | 120° C. | 60° C. |
| Initial | 33.3 | 12.1 | 26.7 | 51.1 |
| 1 hour | 34.7 | 40.7 | 49.7 | 55.3 |
| 2 hours | 34.8 | 29.6 | 82.3 | 53.4 |
| 3 hours | 35.0 | 29.0 | 106.5 | 55.2 |
| 4 hours | 34.6 | 30.3 | 262 | 56.5 |
| 5 hours | 38.4 | 30.6 | 377 | 59.8 |
| 24 hours | 35.1 | 26.9 | $8 \times 10^4$ | 75.5 |
| 26 hours | 35.0 | 35.2 | $9 \times 10^4$ | 80.2 |
| 28 hours | 35.1 | 47.6 | $13 \times 10^4$ | 80.7 |
| 95 hours | 36.1 | 40.7 | $8 \times 10^6$ | 129.1 |
| 119 hours | 36.3 | 61.9 | $10^7$ | 149.1 |
| 143 hours | 37.0 | 49.7 | — | 168.7 |
| 167 hours | 37.6 | 40.1 | — | 222 |
| 191 hours | 37.9 | 42.3 | — | 253 |

These results demonstrate good stability of the pyrrole-impregnated nylon fiber under ambient conditions and immersion in water, while gradual degradation of conductivity occurs at elevated temperatures.

EXAMPLE 7

A solution of polycarbonate (0.25 g) in methylenechloride (2ml) containing 10% by volume of pyrrole is spread onto a glass slide as in Exmaple 1. The resulting thin film is dipped into the iron trichloride solution of Example 1 for 1 hour. The resulting gray translucent film is peeled off the glass backing, rinsed with water and dried under vacuum. The specific conductivity of this film is determined to be $2 \times 10^{-2}$ S/cm.

EXAMPLE 8

A thick nylon film sample measuring 0.32 mm × 11 mm × 26 mm is immersed in a solution consisting of 20% (v/v) pyrrole in ethanol at room temperature for 1 hour. The sample is removed, wiped dry with a paper towel and immersed in a solution consisting of iron trichloride hexahydrate (0.5 M) in distilled water at room temperature for 15 hours. The polymer sample turns black during this time. It is then removed, wiped dry and placed under a vacuum for one hour, then weighed and checked for conductivity by placing alligator clips on either end of the sample and measuring DC resistance across the sample. Results are shown below:

|  | Treated Film | Untreated Film |
| --- | --- | --- |
| Weight (mg) | 114 | 104 |
| Resistance (ohms) | 300 | >10$^9$ |
| Appearance | Black, Opaque | Colorless, Translucent |

It is not possible to rub off any black-colored material from the treated sample, demonstrating that this black substance is impregnated within the film and not coated onto its surface.

EXAMPLE 9

A thick nylon film sample, identical to that of Example 8, is immersed in aniline and held at 100° C. for 1 hour, then removed, wiped dry and immersed in a freshly-prepared solution consisting of ammonium persulfate (1 M) and hydrochloric acid (1 M) in distilled water at room temperature for 5 minutes. The resulting dark-colored sample is removed, wiped dry and placed under a vacuum for 1 hour, then removed and checked for conductivity as in Example 8. A resistance across the sample of $2 \times 10^5$ ohms is obtained. It is not possible to wipe any of the dark-colored substance off the sample with a paper towel, demonstrating that this substance is impregnated in the sample and not coated on its surface.

EXAMPLE 10

A thick nylon film sample, identical to that of Example 8, is immersed in the iron trichloride solution of Example 8 for 7 hours at room temperature. It is then removed, wiped dry and immersed in a solution consisting of pentane saturated with pyrrole (approximately 10% pyrrole v/v) for 1 hour. The nylon film sample remains essentially unchanged in appearance throughout this process, and the resistance across the sample is determined to be $3 \times 10^8$ ohms, compared with 300 ohms for the treated sample of Example 8.

This example demonstrates inoperability of a polypyrrole impregnation procedure, based on best available prior art for polypyrrole impregnation, to the non-porous nylon film material of Example 8.

EXAMPLE 11

The procedure of Example 10 is carried out, substituting ethanol for water as the solvent for the iron trichloride solution. The treated nylon sample has a pale greenish brown appearance and a resistance of $7 \times 10^8$ ohms, compared with 300 ohms for the treated sample of Example 8.

This example demonstrates inoperability of a modified polypyrrole impregnation procedure, based on best available prior art for polypyrrole impregnation, to the non-porous nylon film samples of Examples 8 and 9.

We claim:

1. A method of imparting electrical conductivity to the surface layer, up to 1 mm deep, of non-porous polymers by impregnation with a conductive polymer, said method comprising:
   (a) either diffusing a cyclic monomer selected from the group consisting of pyrrole, aniline and substituted analogs thereof into said non-porous polymer or codissolving said cyclic monomer and said non-porous polymer in a solvent therefor followed by evaporation of said solvent, and
   (b) then exposing the impregnated polymer to a solution containing at least one chemical oxidant selected from the group consisting of trivalent iron compounds, tetravalent cerium compounds, hexavalent molybdenum, tungsten or chromium compounds, divalent copper compounds, monovalent silver compounds, nitrites, quinones, peroxides and peracids, said oxidant(s) being capable of reacting with the cyclic monomer to convert it to an electrically conductive polymeric oxidation product within the surface layer of the impregnated polymer.

2. The method of claim 1 wherein at least a catalytic amount of an acid is added with the oxidant to catalyze the oxidative polymerization.

3. The method of claim 1 wherein the cyclic monomer is pyrrole and the oxidant is iron trichloride.

4. The method of claim 1 wherein the cyclic monomer is aniline and the oxidant is ammonium persulfate.

5. The method of claim 1 wherein the host polymer is a member of the group consisting of polyamide, polyvinylchloride, polycarbonate, polyvinylacetate and polyurethane.

6. The method according to claim 1 wherein the host polymer is present as a fiber, fabric, or thin film.

7. An electrically conductive article formed by the method of claim 1.

* * * * *